United States Patent [19]

Ter Haar et al.

[11] Patent Number: 4,988,587
[45] Date of Patent: Jan. 29, 1991

[54] RECHARGEABLE NON-AQUEOUS CELL

[75] Inventors: Leonard W. Ter Haar, Berkeley Heights; Forrest A. Trumbore, Summit, both of N.J.

[73] Assignee: AT&T Bell Laboratories, Murray Hill, N.J.

[21] Appl. No.: 484,473

[22] Filed: Feb. 23, 1990

Related U.S. Application Data

[63] Continuation of Ser. No. 286,433, Dec. 19, 1988, abandoned.

[51] Int. Cl.$^5$ ............ H01M 10/40; H01M 4/58
[52] U.S. Cl. ........................ 429/194; 429/218; 29/623.1
[58] Field of Search ............ 429/218, 194; 29/623.1

[56] References Cited

U.S. PATENT DOCUMENTS

| | | | |
|---|---|---|---|
| 3,864,167 | 2/1975 | Broadhead et al. | |
| 4,489,145 | 12/1984 | Abraham et al. | 429/218 |
| 4,740,433 | 4/1988 | Lu | 429/94 |
| 4,753,859 | 6/1988 | Brand | 429/197 |
| 4,892,795 | 1/1990 | Fang et al. | 429/194 |

OTHER PUBLICATIONS

*High Energy Batteries*, by Raymond Jasinski, Plenum Press, New York, 1967.
*Russian Inorganic Materials*, 20, 935 (1985), "Interaction in the Nb-Se System" by V. E. Federov, A. V. Mishchenko, and Yu B. Ustimenko, pp. 935-939.

Primary Examiner—Donald L. Walton
Attorney, Agent, or Firm—Oleg E. Alber

[57] ABSTRACT

A procedure is described for making niobium triselenide for use in nonaqueous cells. The procedure involves synthesis of $NbSe_3$ from $Nb_2Se_9$ which is rapid, easily adapted to manufacturing conditions and yield product with excellent characteristics for lithium cell applications.

20 Claims, 1 Drawing Sheet

RECHARGEABLE NON-AQUEOUS CELL

This application is a continuation of application Ser. No. 07/286,433, filed Dec. 19, 1988 now abandoned.

TECHNICAL FIELD

The invention is a process for making a nonaqueous cell and cell made by this process. In particular, the procedure involves an advantageous procedure for synthesizing the active cathode material.

BACKGROUND OF THE INVENTION

Battery technology has undergone considerable change in recent years in response to demands for higher reliability, greater capacity per unit weight or volume, longer shelf life and greater cycle life. This has been due to market demands for more portable equipment (e.g., telephones, tools, computers, etc.) as well as back-up power sources for a variety of devices including memories and other components associated with computers.

A particularly attractive type battery for many applications is a nonaqueous battery, especially those featuring lithium as the active material in the negative electrode. Such battery cells feature very high cell potential and low weight density and result in cells of high energy density (see, for example, *High Energy Batteries*, by R. Jasinski, Plenum Press, New York, 1967, pp. 140–144).

Exceptionally good active materials for the positive electrode of lithium non-aqueous batteries are niobium diselenide, niobium triselenide, and niobium trisulfide (see for example, U.S. Pat. No. 3,864,167 issued on Feb. 4, 1975 to J. Broadhead et al, incorporated herein by reference). These electrode materials not only have high energy density, good charge and discharge characteristics (cycle performance) and good stability, but also are compatible with a large variety of electrolyte systems. Tests carried out on lithium cells made with these positive electrode materials (especially with niobium triselenide) confirm the advantages outlined above.

Electrodes comprising $NbSe_3$ can be fabricated by providing a thin Nb foil and reacting it with Se vapor. The resulting fibrous sheet of $NbSe_3$ is then rolled onto a metal grid that serves as current collector. The above process has several shortcomings, including relatively high materials cost, and relatively long reaction time. Furthermore, it is generally difficult to produce thin sheets of active material of uniform thickness and morphology by means of the prior art technique. Another procedure involves reacting niobium powder with chalcogenide vapor under conditions where the desired niobium chalcogenide is formed. For niobium triselenide, the conditions involve heating the niobium powder in the presence of selenium to a temperature of about 625°–680° C. Often, a two stage heating process is preferred; first heating to about 580° C. for about 15 hours and then heating to about 680° C. for 15 hours. (See for example, the recently filed application entitled "Non-Aqueous Cell Comprising Niobium Triselenide" with inventors Wei-Chou Fang and Brijesh Vyas filed Sept. 14, 1988 with Ser. No. 244,218 U.S. Pat. No. 4,489,145). Niobium-selenium compounds are discussed in a paper by V. E. Fedorov et al., *Russian Inorganic Materials*, 20, 935 (1984).

In order to increase the commercial value of using chalcogenides such as $NbSe_3$ as the active positive electrode material in non-aqueous cells, it is desirable to reduce the cost of fabricating cells with chalcogenide active material and to make the fabrication procedure more easily adaptable to mass production. In particular, it is desirable to find a synthesis procedure for $NbSe_3$ active electrode material that is less expensive, that can be used to produce thin sheets of active material of uniform thickness, and that is less cumbersome and/or more easily adapted to mass production under manufacturing conditions than those known to the prior art.

SUMMARY OF THE INVENTION

The invention is a process for making a nonaqueous cell comprising positive electrode, electrolyte and negative electrode in which the active material in the positive electrode comprises niobium triselenide and the niobium triselenide is made by heating $Nb_2Se_9$ to a temperature where it is substantially converted to $NbSe_3$ typically between 625° C. and 780° C. Preferred is a temperature range from 630° C. to 690° C. with 650° C. to 680° C. most preferred. Generally, the time of reaction may vary over large limits, including from about one minute to about 25 hours. Shorter reaction times are advantageous. Use of higher temperatures shortens reaction times. Removal of selenium (e.g., by venting to the atmosphere or use of a cold region on the closed reaction tube) also shortens reaction times and often permits use of a lower temperature range in the formation of $NbSe_3$. Also, use of fine powders of $Nb_2Se_9$ shortens reaction times. Reaction times as short as 10 minutes to 4 hours are achieved.

At higher temperatures (e.g., 680° C. to 780° C.) in closed containers, caution should be used because of selenium overpressure.

A typical procedure typically preferred for making lithium cells involves deposition of a fine powder of $Nb_2Se_9$ onto a substrate and then conversion of the $Nb_2Se_9$ to niobium triselenide by heating in a sealed quartz tube. Often, a uniform thin layer of niobium triselenide is desired and this is conveniently done by making a slurry of $Nb_2Se_9$ powder, depositing the well-mixed slurry onto the substrate (e.g., by dipping, spraying, etc.), removing the liquid, for example by evaporation and then carrying out the reaction to form the niobium triselenide. The niobium triselenide obtained in this way is in the form of fibrous sheets which is highly advantageous for battery applications. Also, the reaction time can be made very short by suitable choice of temperature, bulk of $Nb_2Se_9$ being decomposed and pressure of selenium. The niobium triselenide formed in this way can be used as is in a battery after removal from the substrate.

In some applications, the niobium triselenide is removed from the inert substrate, rolled onto a metal mesh (e.g., a nickel mesh) and shaped for use in a cylindrical lithium cell. The procedure is rapid, easily adapted for mass production and can be carried with a minimum of operator attention. The resulting positive electrode exhibits excellent electrochemical characteristics including high capacity per unit weight, good recycling characteristics and excellent reliability.

BRIEF DESCRIPTION OF THE DRAWING

The Figure shows a schematic diagram of the relevant parts of an exemplary rolled nonaqueous cylindrical cell made in accordance with the invention.

DETAILED DESCRIPTION

Figure 1:
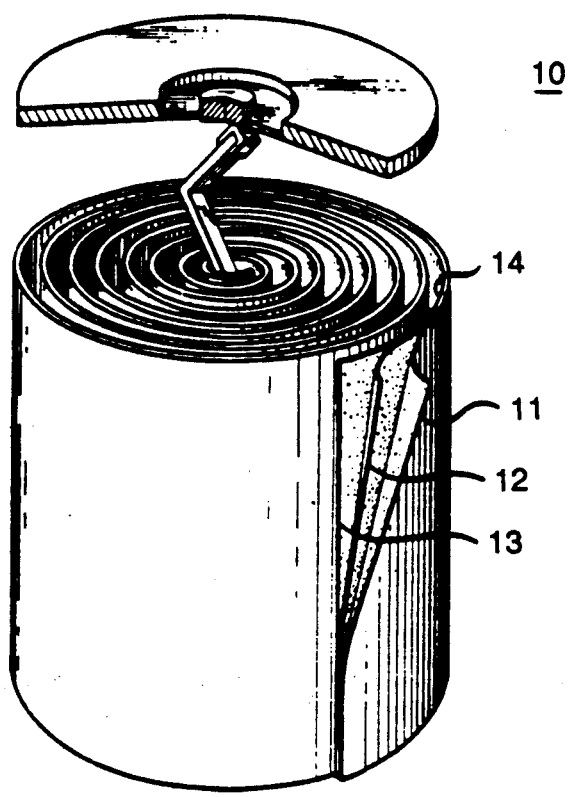

The invention is based on the discovery that niobium triselenide suitable for use in the positive electrode of nonaqueous cells can be produced rapidly and reliably from $Nb_2Se_9$ (diniobium nonaselenide). The process for forming the niobium triselenide involves heating the $Nb_2Se_9$ to a temperature where $Nb_2Se_9$ loses selenium to form $NbSe_3$. Generally, this can be done over a wide temperature range (probably as low as 500° C. or even lower if selenium pressure is reduced) but generally not over about 780° C. because $NbSe_3$ is unstable above that temperature, forming $NbSe_2$ and selenium.

In currently preferred embodiments of the invention, powder $Nb_2Se_9$ is deposited as a more or less uniform layer on a substrate before reaction to $NbSe_3$. This uniform layer may be obtained by making a slurry of powdered $Nb_2Se_9$, insuring uniformity of the slurry by stirring or other means and depositing the slurry on a substrate. The liquid is then removed from the deposited slurry generally by some evaporation procedure (heating, vacuum drying, etc.). After drying, the reaction is carried out typically by heating to about 680° C. to 720° C. for 6 to 15 hours. Six hours is generally needed to insure complete reaction although shorter times are often sufficient, particularly at high temperatures. The reaction is generally complete at 15 hours but longer times are not detrimental.

The slurry may be deposited on the substrate in a variety of ways including dipping, spraying, etc., and the liquid is generally removed by heating. An advantage of this procedure is the ease and reliability of obtaining uniform layers of $Nb_2Se_9$ which results in uniform layers of $NbSe_3$. Also, this procedure results in good adherence of the powdered $Nb_2Se_9$ to the substrate, an advantage during commercial manufacture.

Various substrate materials may be used including materials to be incorporated into the finshed cell (such as a metal current collector, as well as inert substrates such as alumina and quartz glass.

The slurry composition may vary over large limits. The liquid should be chemically inert to the $Nb_2Se_9$ powder and the substrate. It should have reasonable viscosity so the slurry suspension does not separate too fast and should have a reasonable boiling point (e.g., less than about 200° C.) to facilitate removal. Propylene carbonate is quite suitable and is currently preferred but other liquids (glycerol, various oils, etc.) are also useful. Various other liquids may be useful as may occur to those skilled in this art. The concentration of powdered $Nb_2Se_9$ may also vary over large limits, typically from 10 to 90 weight percent $Nb_2Se_9$, with 30 to 70 weight percent $Nb_2Se_9$ preferred. Particle size of the powder may also vary over large limits but mesh size less than about 325 is currently preferred because of adherence of powder to substrate and more rapid reaction to form the $NbSe_3$.

The $Nb_2Se_9$ may be made in a variety of ways well known in the art. A typical procedure, preferred at the present time is to react stoichiometric amounts of Nb and Se in a closed vessel (such as a quartz tube) in the temperature range from 450° C. to 680° C. for about 12 hours. A preferred temperature range is from 560° C. to 600° C.

The cell fabrication may be completed in a variety of ways well known in the battery art. Both large and small cells can be made with a variety of electrolytes and separator materials. Various shapes and cell structure are useful. Particularly attractive are rolled cylindrical cells such as those described in U.S. Pat. No. 4,740,433 issued to W. P. Lu on Apr. 26, 1988 and U.S. Pat. No. 4,753,859 issued to L. E. Brand on June 28, 1988. These patents described both separator material and electrolyte systems useful in the practice of the invention and are incorporated herein by reference.

Relevant parts of a useful rolled cylindrical cell 10 are shown schematically in the Figure. The cell comprises four layers rolled into a cylindrical shape. The four layers are a negative lithium electrode 11, a separator 12, a positive electrode 13, and another separator layer 14. The active material in the positive electrode is advantageously manufactured in accordance with the instant invention. The four-layer roll is generally put into a cylindrical container with suitable electrical connections to the positive and negative electrodes, respectively. The container is filled with an appropriate electrolyte to permit electrochemical action. These parts can be conventional and are not shown.

We claim:

1. A process of making a nonaqueous cell comprising a negative electrode, a separator, a positive electrode, and an electrolyte, said positive electrode comprising niobium triselenide, said process including the step of assembling the negative electrode, separator, positive electrode and electrolyte to form a nonaqueous cell, CHARACTERIZED IN THAT the positive electrode is made by a procedure that comprises the steps of (a) at least once depositing a liquid slurry comprising $Nb_2Se_9$ powder on the substrate and removing the liquid from the deposited slurry to form a dry coating of $Nb_2Se_9$ powder thereon, said slurry comprising from 10 to 90 weight percent of $Nb_2Se_9$, b) heating the substrate with the said coating at a temperature within a range of from 625° and 780° C. and for a period of time ranging from one minute to 25 hours, said temperature and period of time being sufficient to form a layer of fibrous material comprising $NbSe_3$, and c) using the so-formed fibrous material with or without a metal support therefor as the positive electrode.

2. The process of claim 1 in which the temperature range is from 630° C. to 690° C.

3. The process of claim 2 in which the temperature range is from 650° C. to 680° C.

4. The process of claim 1 wherein the liquid slurry is deposited by spraying and wherein the liquid is removed by a procedure that comprises heating of the substrate with the slurry thereon.

5. The process of claim 1 wherein the substrate comprises a material selected from the group consisting of alumina and quartz.

6. The process of claim 5 wherein the substrate comprises alumina.

7. The process of claim 1 wherein the liquid in the slurry comprises propylene glycol.

8. The process of claim 1 wherein the $Nb_2Se_9$ powder has particle size finer than about mesh powder has particle size finer than about mesh 325.

9. The process of claim 1 in which the $Nb_2Se_9$ is made by reacting niobium with selenium in the temperature range from 450° C. to 620° C.

10. The process of claim 9 in which the $Nb_2Se_9$ is made by reacting niobium with selenium at a temperature of approximately 580° C.

11. The process of claim 1, in which the period of time ranges from 10 minutes to 4 hours.

12. The process of claim 1, in which the slurry comprises 30 to 70 weight percent $Nb_2Se_9$.

13. The process of claim 1, in which said temperature ranges from 680° to 720° C. and said period of time ranges from 6 to 15 hours.

14. A nonaqueous cell comprising a lithium negative electrode, a separator, a positive electrode comprising niobium triselenide active material, an electrolyte, and means for making electrical contact with the negative and the positive electrode,

CHARACTERIZED IN THAT the positive electrode is made by a procedure that comprises the steps of (a) at least once depositing a liquid slurry comprising $Nb_2Se_9$ powder on the substrate and removing the liquid from the deposited slurry to form a dry coating of $Nb_2Se_9$ powder thereon, said slurry comprising from 10 to 90 weight percent of $Nb_2Se_9$, (b) heating the substrate with the said coating at a temperature within a range of from 625° and 780° C. and for a period of time ranging from one minute to 25 hours, said temperature and period of time being sufficient to form a layer of fibrous material comprising $NbSe_3$, and (c) using the so-formed fibrous material with or without a metal support therefor as the positive electrode.

15. The cell of claim 14, in which the temperature range is from 630° to 690° C.

16. The cell of claim 14, in which the temperature range is from 650° to 680° C.

17. The cell of claim 14, in which the powder has particle size finer than about mesh 325.

18. The cell of claim 14, in which the period of time ranges from 10 minutes to 4 hours.

19. The cell of claim 14, in which said temperature range is from 680° to 720° C. and said period of time ranges from 6 to 15 hours.

20. The cell of claim 14, in which the slurry comprises 30 to 70 weight percent $Nb_2Se_9$.

* * * * *

UNITED STATES PATENT AND TRADEMARK OFFICE
CERTIFICATE OF CORRECTION

PATENT NO. : 4,988,587

DATED : JANUARY 29, 1991

INVENTOR(S) : Leonard W. Ter Haar, Forrest A. Trumbore

It is certified that error appears in the above-identified patent and that said Letters Patent is hereby corrected as shown below:

Column 4, lines 61 and 62 after mesh delete "powder has particle size finer than about mesh"

Signed and Sealed this

Ninth Day of June, 1992

Attest:

DOUGLAS B. COMER

Attesting Officer        Acting Commissioner of Patents and Trademarks